US006469743B1

United States Patent
Cheney et al.

(10) Patent No.: US 6,469,743 B1
(45) Date of Patent: Oct. 22, 2002

(54) PROGRAMMABLE EXTERNAL GRAPHICS/VIDEO PORT FOR DIGITAL VIDEO DECODE SYSTEM CHIP

(75) Inventors: Dennis P. Cheney, Vestal; Lawrence D. Curley, Endwell, both of NY (US); William R. Lee; Leland D. Richardson, both of Apex, NC (US); Ronald S. Svec, Berkshire, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,757

(22) Filed: Jun. 9, 1999

(51) Int. Cl.[7] .................................................. H04N 5/44
(52) U.S. Cl. ........................ 348/553; 348/705; 345/520; 345/501; 326/37; 326/38
(58) Field of Search ............................... 348/554, 553, 348/555, 552, 705, 706; 345/501, 502, 503, 519, 520, 522; 710/2, 3, 7, 20, 36, 37, 38, 58; 326/38, 41, 39, 37; H04N 5/44

(56) References Cited

U.S. PATENT DOCUMENTS

| | | | |
|---|---|---|---|
| 5,027,212 A | 6/1991 | Marlton et al. ............. 358/183 |
| 5,489,947 A | 2/1996 | Cooper ....................... 348/589 |
| 5,534,942 A | 7/1996 | Beyers, Jr. et al. ......... 348/569 |
| 5,576,765 A | 11/1996 | Cheney et al. .............. 348/407 |
| 5,579,308 A | 11/1996 | Humpleman ................ 370/58.1 |
| 5,654,751 A | 8/1997 | Richard, III ................. 348/192 |
| 5,655,112 A | 8/1997 | MacInnis ..................... 395/501 |
| 5,668,599 A | 9/1997 | Cheney et al. .............. 348/402 |
| 5,673,058 A | 9/1997 | Uragami et al. ............... 345/3 |
| 5,675,390 A | 10/1997 | Schindler et al. ........... 348/552 |
| 5,734,853 A | 3/1998 | Hendricks et al. .......... 395/352 |

Primary Examiner—Michael H. Lee
(74) Attorney, Agent, or Firm—William H. Steinberg, Esq.; Kevin P. Radigan, Esq.; Heslin Rothenberg Farley & Mesiti P.C.

(57) ABSTRACT

A programmable bi-directional external graphics/video (EGV) port for a video decode system chip having a video decoder and an internal digital display generator circuit is provided. The programmable EGV port employs a fixed number of signal input/output (I/O) pins on the video decode system chip while providing a plurality of connection configurations for an external graphics controller, an external digital display generator circuit and an external digital multi-standard decoder to the video decoder or the internal digital display generator circuit of the chip. The EGV port includes receiver/driver circuitry for accommodating in parallel a plurality of input/output signals, including pixel data signals and corresponding synchronization signals, as well as a programmable port controller adapted to be coupled between the receiver/driver circuitry and an internal bus of the video decode system allowing access to at least one of the video decoder and the internal digital display generator circuit. The programmable port controller is programmable to either receive data into the video decode system chip or to send data out from the video decode system chip.

25 Claims, 13 Drawing Sheets

PROGRAMMABLE EXTERNAL GRAPHICS/ VIDEO PORT FOR DIGITAL VIDEO DECODE SYSTEM CHIP

TECHNICAL FIELD

The present invention is directed generally to digital video signal processing employing an integrated decode system chip, and more particularly, to a versatile external graphics/ video (EGV) port for an integrated decode system chip. The EGV port comprises a predefined number of signal input/ output (I/O) pins and a dynamically configurable port controller which provides multiple connection configurations to one or more of an external graphics controller, an external digital display generator circuit and an external digital multi-standard decoder.

BACKGROUND OF THE INVENTION

Multiple functions are today commonly being integrated onto a single system chip. Unfortunately, once architecture for integration of several discrete components onto a single chip is defined, functionality of the chip is necessarily limited by the components thereof. Therefore, in order to enhance adaptability of an integrated system chip, such as a digital video decode system chip for use in a set top box or digital video disc player, it may be desirable to allow for external functions to be coupled to the integrated system chip, to either enhance or replace an existing component of the system chip or add new capability to the system chip.

In a highly integrated digital video decode system chip, a significant amount of function must be brought out on as few a pins as possible. The driving factor for this is the extremely competitive environment of today's consumer electronics market, which demands attention to the cost of the module packaging and to providing the highest VLSI integration achievable by reducing the component count for the resultant printed circuit board. As one example, Plastic Quad Flat Package (PQFP) packaging for a video decode system chip today often employs 240 pins, with a maximum of 208 signal input/output pins. Alternatively, many inexpensive printed circuit board manufacturers' equipment will only handle PQFP packaging with 208 pins, which has a maximum of 174 signal I/O pins. Therefore, in order to integrate enhanced functionality into, for example, a digital video decode system controller chip having 240 pins or 208 pins, careful attention must be given to the number of pins needed to integrate the externally provided function(s).

Additionally, current graphics functions provided with integrated video decode system chips often only meet very low-end requirements for low cost or non-interactive digital video set-top boxes (STBs). Thus, a means to upgrade the STB graphics capabilities is believed desirable. However, the printed circuit board manufacturers again demand packages with as few pins as possible, such as PQFP packages with 208 I/O pins, or 240 pins. Within such packages, the signal I/O count is typically already at the package limit and the gate count (i.e., silicon area) is already in the degraded yield portion of the curve for current technology. These factors together do not allow for any functional graphics upgrade within the integrated video decode system chip design which would raise the cost of the chip beyond what the low end of the market is willing to pay.

DISCLOSURE OF THE INVENTION

In view of the above, a need exists in the art for an adaptable external graphics/video port which allows connection of an external graphics controller, for example, to either replace or supplement the integrated graphics support on chip. Additionally, it is herein deemed desirable for an analog video channel to be able to be blended with either output from an external graphics controller or an internal graphics controller or a combination thereof. These functions, as well as others described herein, must be implementable with no or minimal impact on current pin count and an absolute minimum of glue logic on the printed circuit board to provide a least expensive solution. The present invention is directed to meeting these needs.

Briefly summarized, the present invention comprises in one aspect an external graphics/video (EGV) port for a video decode system chip having a video decoder and an internal digital display generator circuit. The EGV port comprises receiver/driver circuitry for accommodating a plurality of input/output signals, and a programmable port controller. The programmable port controller is adapted to be coupled between the receiver/driver circuit and at least one internal bus of the video decode system chip coupled to at least one of the video decoder and to the internal digital display generator circuit. The programmable port controller is programmable to either receive data into the video decode system chip for forwarding to at least one of the video decoder and the internal digital display generator circuit or to send data out from the video decode system chip from at least one of the video decoder and the internal digital display generator circuit. The data is received through or sent out through the receiver/driver circuitry of the EGV port.

In another aspect, the present invention comprises a programmable bi-directional external graphics/video (EGV) port for a video decode system chip having a video decoder and an internal digital display generator circuit. The EGV port includes a plurality of signal input/output (I/O) receiver/ drivers, and a programmable port controller. The programmable port controller is coupled to the plurality of I/O receiver/drivers and to at least one internal bus of the video decode system chip. The at least one internal bus is coupled to at least one of the video decoder and the internal digital display generator circuit. The programmable port controller comprises first programmable logic for receiving video pixel data on chip or sending video pixel data off chip and second programmable logic for independently receiving on chip or sending off chip synchronization signal(s) for the video pixel data, wherein the first programmable logic and the second programmable logic allow independent outputting of pixel data from the chip while inputting synchronization signal(s) to the chip, and allow for independent inputting of video pixel data to the chip while outputting synchronization signal(s) from the chip. restate, provided herein is a multi-use, configurable video and graphics port for an integrated video decode chip. The multi-use port described herein allows a minimal amount of pins to be used for any of several possible connection configurations, and enables the blending of video from either an integrated MPEG video decoder (MVD) or an external digital multi-standard decoder (DMSD), with graphics from either or both an external graphics controller (EGPH) or an integrated on-screen display generator (OSD), and the driving of either or both an internal digital video encoder (IDENC) or an external digital video encoder (EDENC).

Numerous configurations employing the EGV port presented herein are depicted in the drawings and described below. These configurations include:

Transmission of video data through the external graphics/ video port to an external digital video encoder;

Transmission of video data through the external graphics/ video port to an external graphics controller chip where the video may be mixed or blended with graphics and then to an external digital video encoder;

Receipt of digital video output from a DMSD signal received through the external graphics/video port for forwarding to an internal digital video encoder;

Receipt of an analog video signal through the DMSD where the analog video is digitized and sent to the external graphics/video port to the video decoder where it may be mixed or blended with the internal graphics and then sent to the internal digital video encoder;

Forwarding of graphics from the external graphics controller through the external graphics/video port to the video decoder, with resultant blended video and graphic data forwarded to the internal digital video encoder; and Receipt of a signal through the DMSD, forwarding to the external graphics controller for presentation to the video decoder through the external graphics/video port and hence output through the internal digital video encoder.

Video information must be synchronized to a single source or significant buffering and synchronization logic will be required forcing increased production costs. The EGV port presented herein provides the flexibility to synchronize all devices, (i.e., the IDENC, EDENC, EGPH, MVD, OSD, & DMSD) to any one of the following devices ensuring that the added production costs of buffering is not required for any of the listed configurations: DMSD, EDENC, EGPH & IDENC.

Advantageously, the EGV port of the present invention is a multi-use port, which in one embodiment, comprises a single 12-pin interface that allows:

External graphics upgrading without glue logic or additional digital display generator circuitry.

Internal DENC isolated testing for macrovision certification.

Blending graphics on an analog channel equivalent to a digital channel's graphics capability without requiring an external (additional) DENC.

Blending upgraded external graphics with an analog and digital channel utilizing an external DENC.

Adding additional graphics plane(s) to an integrated video decoder's existing graphics capability, maintaining software compatibility for base graphics function.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, described below is a novel multi-use graphics/video port for a video decode system chip such as used within a digital video set-top box (STB) or a digital video disc (DVD) player. This external graphics/video (EGV) port is readily configurable to connect various external components to the video decode system chip through a predefined, limited number of signal input/output pins of the chip. Further, the EGV port, and programmable controller thereof, is adapted to either receive or send synchronization signals for pixel data being output or input such that the synchronization signals and pixel data input/output are independent, that is, is programmable such that the synchronization signals can be received on chip while pixel data is being sent off chip or, conversely, synchronization signals can be output off chip while pixel data is being received on chip through the versatile EGV port. These concepts are described further with reference to the detailed configuration examples presented below.

As is well-known, the MPEG-2 standard describes a digital video encoding method that results in substantial bandwidth reduction by a subjective lossy compression followed by a lossless compression. Encoded, compressed digital data is subsequently decompressed and decoded in an MPE-2 decoder. By way of example, video decoding in accordance with the MPE-2 standard is described in detail in commonly assigned U.S. Pat. No. 5,576,765, entitled "Video Decoder", which is hereby incorporated herein by reference in its entirety.

Although the present invention is described hereinbelow in connection with an MPED-2 video decoder, such as discussed in the above-incorporated U.S. Pat. No. 5,576,765, the invention is not limited to use with an MPE-2 decoder, but rather, can be employed by any integrated video decode and/or display system chip where it is desirable to access one or more external devices for enhanced processing, such as enhanced graphics or video processing.

Figure 1:
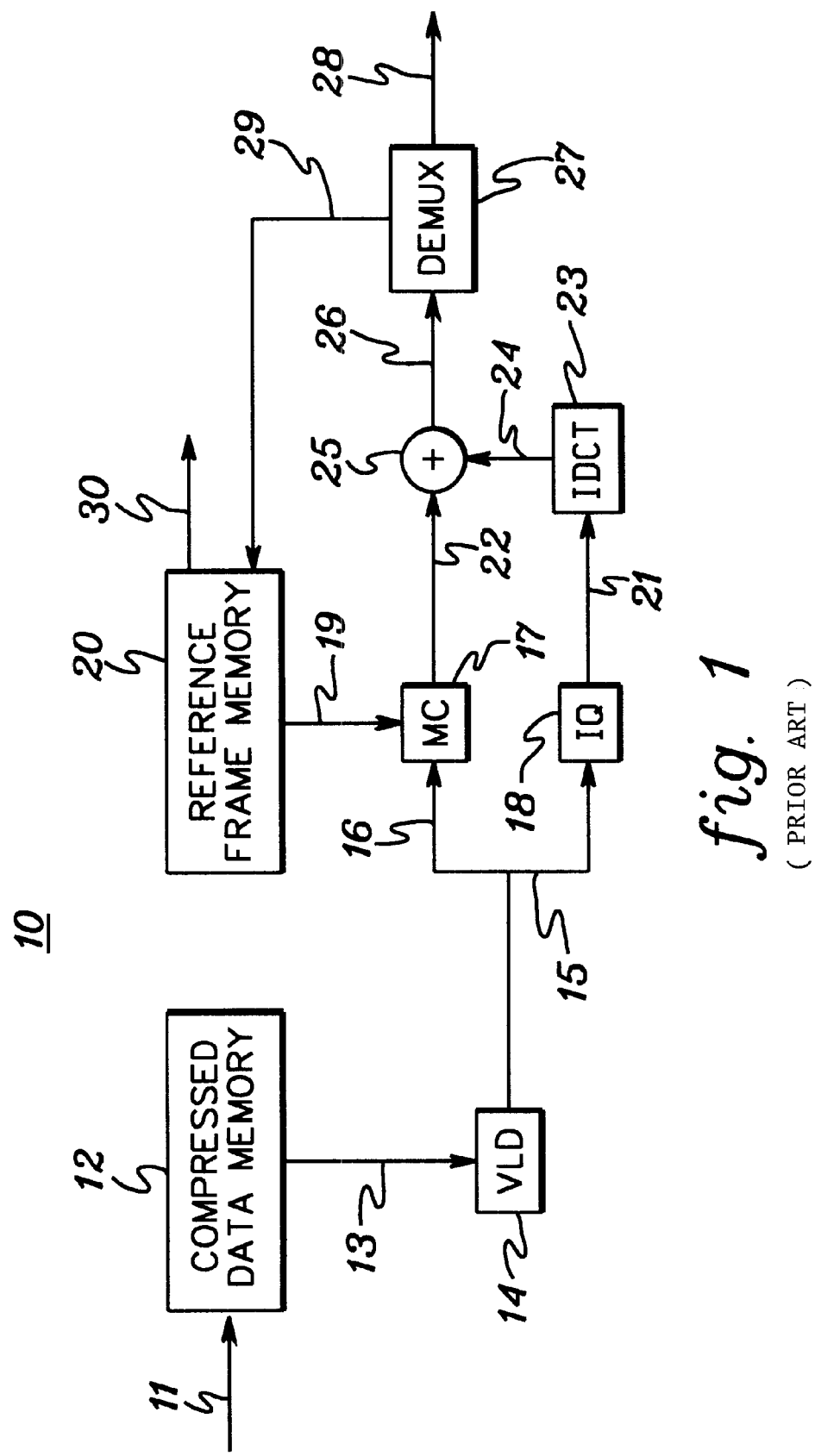
FIG. 1 depicts a general block diagram of a video decode unit.

As background, FIG. 1 shows a diagram of a conventional video decoder. Compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as signal 22 to the adder 25. The inverse quantization unit computes the unquantized coefficients, which are sent as signal 21 to the inverse discrete cosine transform (IDCT) unit 23. The inverse discrete cosine transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Figure 2:
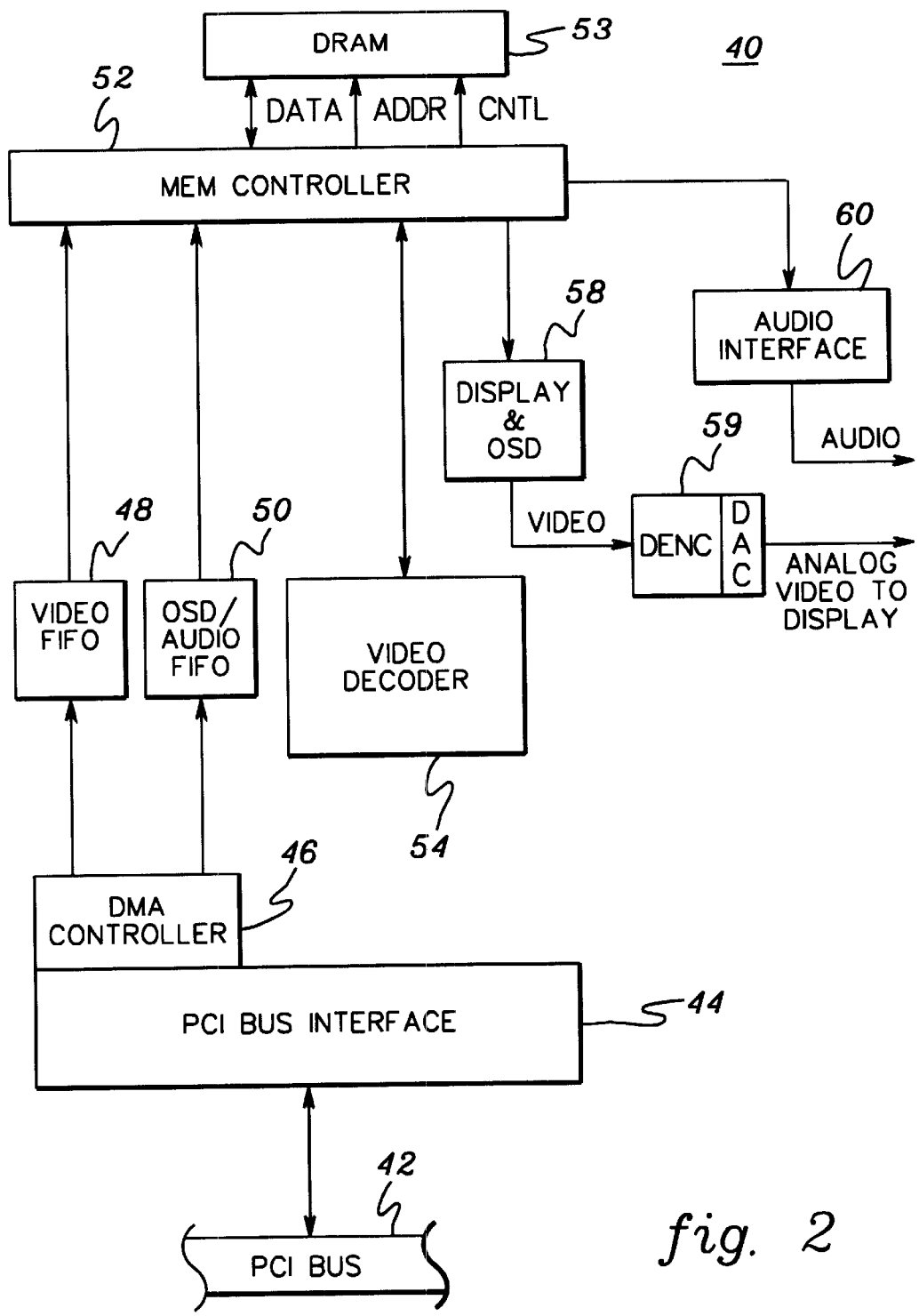
FIG. 2 is a block diagram of a video decode system chip to employ an external graphics/video (EGV) port in accordance with the principles of the present invention.

A partial embodiment of a decode system chip, generally denoted 40, to employ the concepts of the present invention is depicted in FIG. 2. System 40 includes, e.g., a PCI bus interface 44 which couples the decode system 40 to a PCI bus 42. MPEG encoded video data is fetched from PCI bus 42 by a DMA controller 46 which writes the data to a video first-in/first-out (FIFO) buffer 48. The DMA controller also fetches on-screen display (OSD) and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 1. Conventionally, the decoded video data is then stored back into the frame buffers of DRAM 53 for subsequent use. When a reference frame is needed, or when video data is to be output from the decode system, stored data in DRAM 53 is retrieved by the MEM controller and forwarded for output via a display & OSD interface 58 through a digital video encoder/digital-to-analog converter chip 59. Audio data, also retrieved by the video controller 52, is output through an audio interface 60.

As noted briefly above, this invention is directed in one aspect to a versatile external graphics/video (EGV) port (and controller) which allows various external devices in different configurations to be coupled through a common set of pins to an integrated decode system chip, such as depicted in FIG. 2.

To briefly summarize, the time multiplexed bidirectional port of the present invention allows for a multitude of data flow configurations. For example, the following data flows are possible:

| | |
|---|---|
| VID-> EGVOut-> EDENC | 1. |
| VID-> EGVOut-> EGPH-> EDENC | 2. |
| DMSD-> EGVIn-> IDENC | 3. |
| DMSD-> EGVIn-> VID-> IDENC | 4. |
| DEGPH-> EGVIn-> VID-> IDENC | 5. |
| DMSD-> EGPH-> EGVIn-> VID-> IDENC | 6. |

Wherein:
VID=video data stream;
EGV=external graphics/video port;
EDENC=external digital video encoder macro;
EGPH=external graphics controller chip;
DMSD=digital multi-standard decoder (TV decoder) chip;
IDENC=internal digital video encoder macro.

Although each of the above configurations could be implemented dynamically using a universal port in accordance with the principles of the present invention, normal operation would define a single configuration for each productized solution that a customer implements. Note that the plurality of configurations listed above are possible without effecting the number of signal I/O pins on the VLSI device beyond the number of pins needed for just one of the connections.

Figure 3:
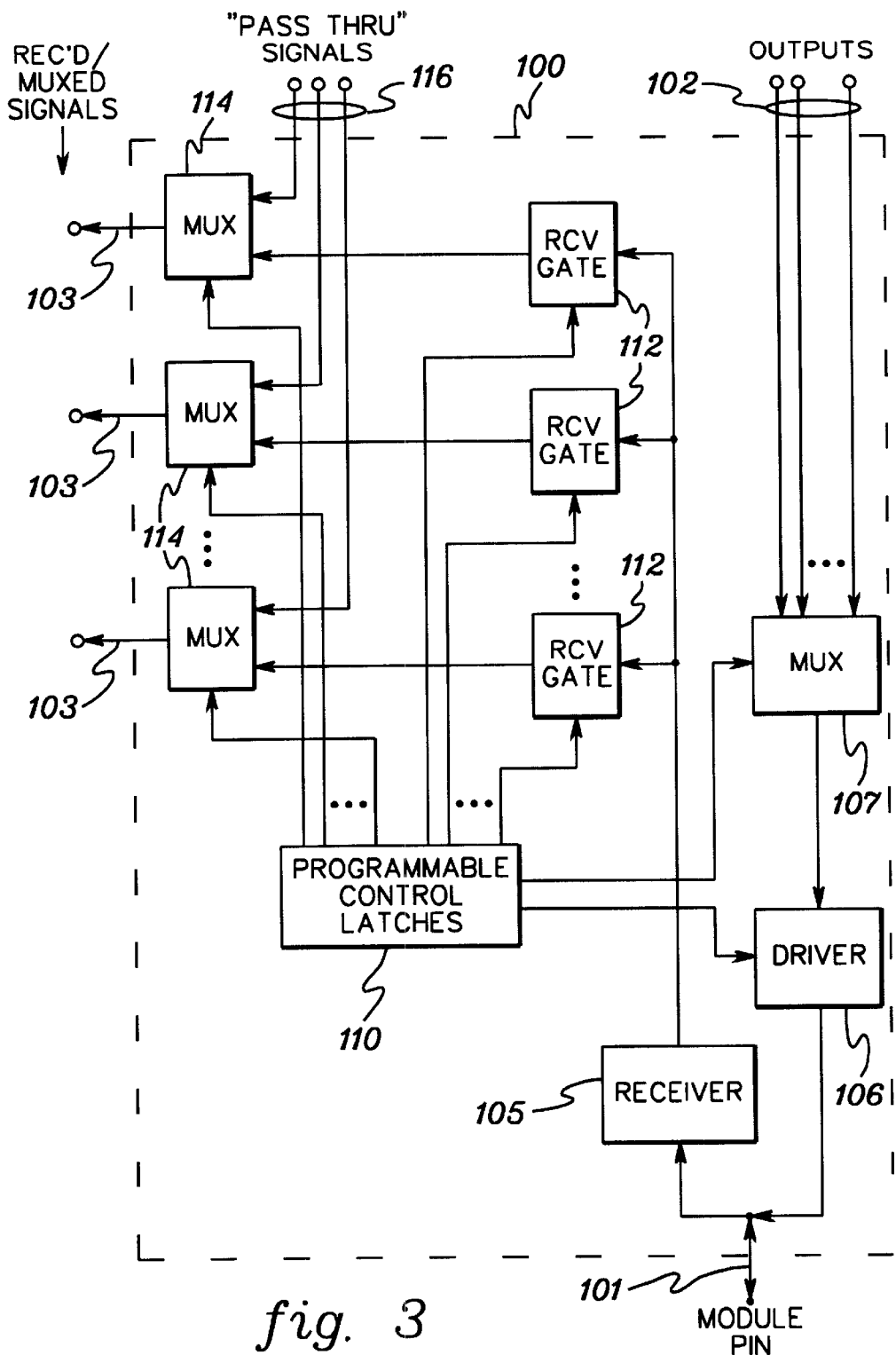
FIG. 3 is a block diagram of one example of circuitry for one bit of an EGV port in accordance with the principles of the present invention.

One embodiment of a generic external graphics/video port, generally denoted 100, in accordance with the principles of the present invention is depicted in FIG. 3. As a specific example, this EGV port 100 comprises one bit of a multi-bit bi-directional port to be implemented. The bi-directionality is under programmable control with the ability to individually select the direction for the video data, accompanying syncs, as well as a chroma reference signal and pixel clock signal. The timings and format of the data preferably conform to the ITU R 656 standard, while the syncs and chroma reference (CREF) are provided for compatibility with external devices.

EGV port 100 is an example of circuitry in accordance with the present invention for one module pin 101. Port 100 receives output signals 102 from on-chip components, such as a video decoder and internal digital video encoder (DENC). Received and multiplex signals are sent out on lines 103, again to internal components of the chip such as the video decoder and internal DENC. Module pin 101 has associated receiver 105 and driver 106 circuitry for selectively driving output to pin 101 or receiving input from pin 101. Driver 106 receives input from a multiplexer 107, itself having as input the output signals 102 from the on-chip components. Programmable control latches 110 control mux 107, and driver 106. Receiver 105 forwards signals to receiver gates 112 for presentation to multiplexers 114. Receiver gates 112 and multiplexers 114 again are controlled by programmable control latches 110. Pass through signals 116 are also input to multiplexers 114, allowing internal macro outputs to drive macro inputs that are optionally driven by externally received signal 101 via receiver 105.

Figure 4:
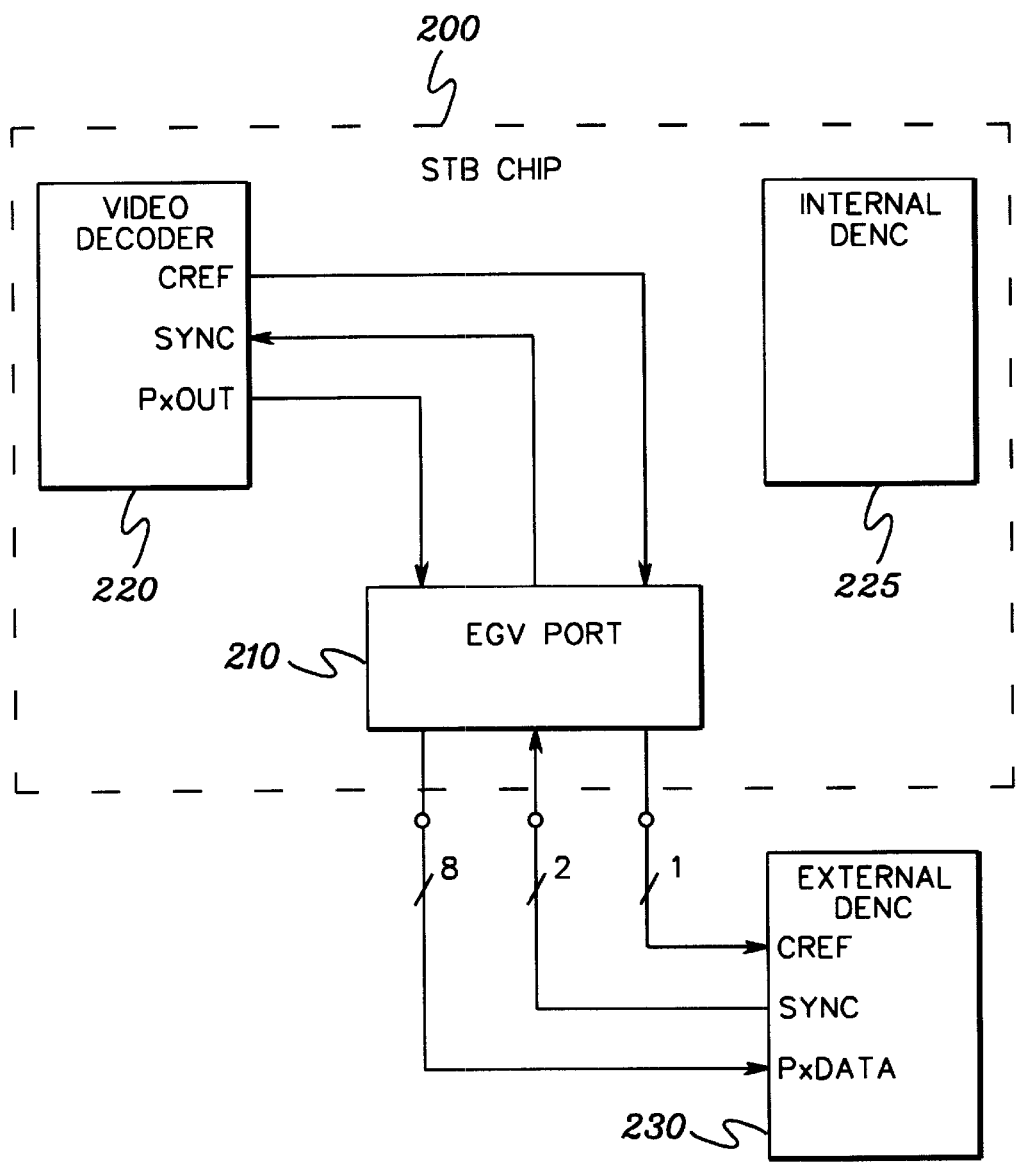
FIG. 4 depicts one connection example for an EGV port in accordance with the principles of the present invention, wherein the EGV port couples an external digital display generator circuit to a video decode system chip of a digital video set-top box.

Operationally, signals from the integrated chip's devices (e.g., video decoder or internal DENC) to be output from the chip are attached at the "output" ports 102 which feed into mux 107 and eventually driver 106 and module pin 101. The programmable control latches are set to select the desired signal which is driven to the output. The actual setting of the control latches can be accomplished through various means. In one implementation, the latches can be set by a control program implementable by one skilled in the art running on a processor also integrated on the system chip 200 (FIG. 4). Note that the programmable control latches 110 are also controlling the driver 106, allowing the direction of the signal at the module pin to be under similar program control. For example, the same module pin can be defined as either a sync input or a sync output as will be apparent to one skilled in the art from the configurations depicted in FIGS. 4–13 and described below.

Receiver 105 allows an external signal to be received on-chip. The received signal is passed to a plurality of receive gates 112, and these gates are also under independent control of the programmable control latches 110. The gates allow the received signal to be either blocked at this point or passed to a receive multiplexer 114. The receive multiplexer selects, again under control of the programmable latches 110, whether the received signal or an alternate "pass through signal" will be forwarded to the corresponding received/multiplexed signal port. Connections are made between the received/multiplexed signal ports and the internal DENC and video decoder to deliver these messages appropriately. Note that depending upon the implementation desired, receive gates 112 may be eliminated or merged with the receive multiplexers 114.

As a further overview, select one pixel data bit. Internal to the integrated chip, the video decoder's pixel output data will be connected to both the outputs 102 and the "pass through" ports 116 of the EGV port 100. One of the "received/multiplexed" ports will be connected to the pixel data port of the internal DENC and a second will be connected to the pixel input of the video decoder. All of these internal connections are fixed, i.e., built in to chip wiring, with flexibility arising from the programmability of the EGV port.

By way of further example, the configuration of FIG. 4 can be easily implemented by setting the programmable control latches 110 to select the video decoder's PxOUT signal and activating the driver, thereby passing the data through the "module pin" which is connected to the external DENC's PxDATA pin. The receive gates and MUXs are programmed off, since no data is coming back into the chip through the pin in this configuration.

Figure 7:
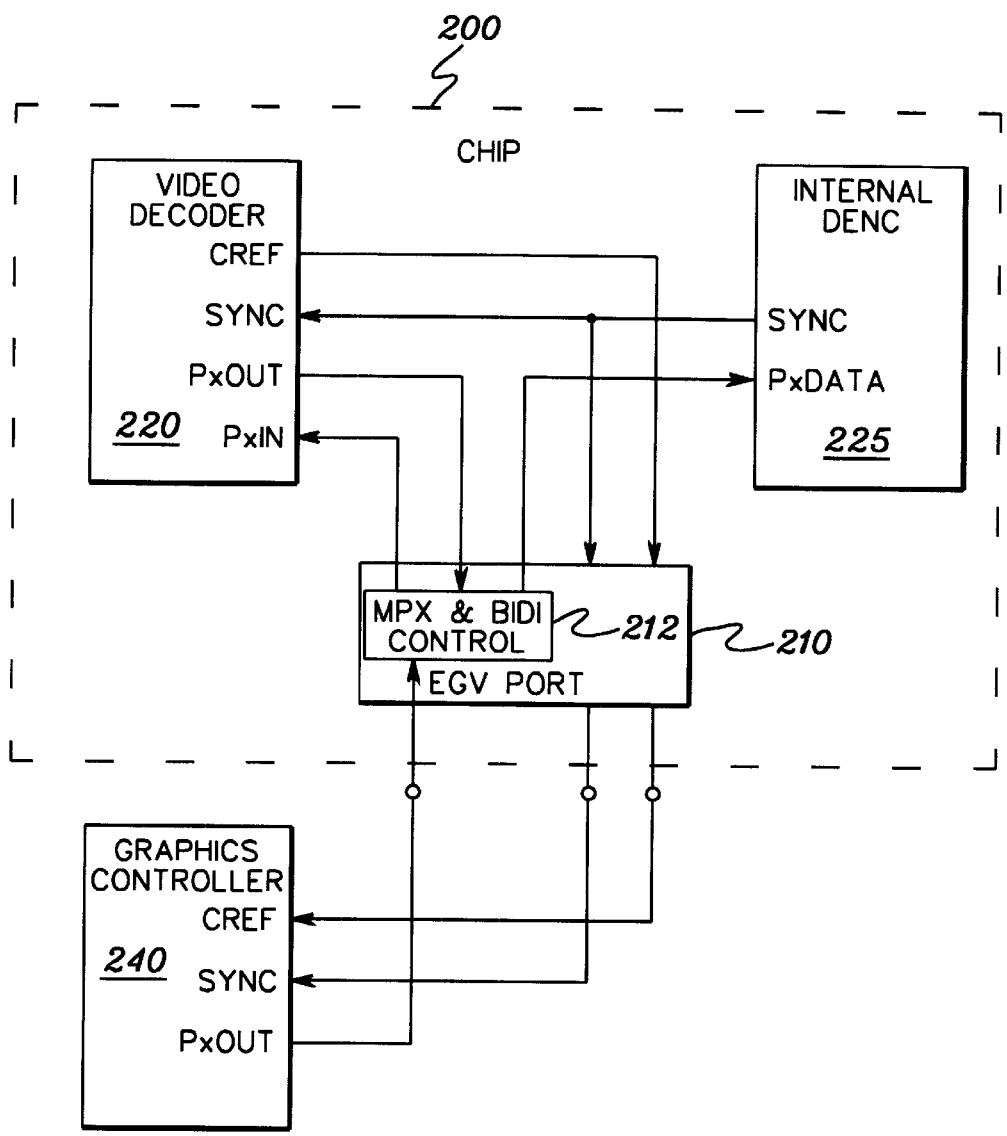
FIG. 7 depicts still another connection example for an EGV port in accordance with the principles of the present invention, wherein an external graphics controller is coupled to the video decode system chip.

For the configuration depicted in FIG. 7, the graphic controller's PxOUT data will be connected to the "module pin" port of the EGV port. The driver will be programmed off since data is being received from the external graphics controller. The received data will be gated through the appropriate receive gate to the receive MUX which is connected to the video decoder's PxIN port. This brings the graphics data into the video decoder. The video decoder subsequently sends the processed graphics plus video data out on its PxOUT port, which in one example, is connected to one of the EGV port's "pass through" ports and receive MUX. Selects for this receive MUX are set to then pass this data to the internal DENC's PxDATA, completing the path.

FIGS. 4–13 depict various applications or connection configurations for a video decode system chip, such as a digital video set-top box (STB) chip, and external circuitry through a programmable or multi-use EGV port in accordance with the principles of the present invention. By way of example an external digital display generator circuit (including, for example, an external digital video encoder (DENC) macro and a digital-to-analog converter), an external graphics controller, and an external digital multi-standard decoder (DMSD) could be coupled in combination or individually with the video decode system chip through the multi-use EGV port disclosed herein.

Before describing FIGS. 4–13, the signal lines depicted therein for the various internal and external components shown are defined as follows.

Video Decoder

| | |
|---|---|
| VID_PIXEL_DATA_OUT | 8-bit data bus output from the video decoder carrying the luma and chroma values for each pixel of the decoded digital video picture. |
| VID_PIXEL_DATA_IN | 8-bit data bus input to the video decoder carrying the luma and chroma values for each pixel of a digital video picture which will be blended (in the video decoder) with either the "On Screen Display" (OSD) graphic or the decoded video. |
| VID_HSC, VID_VSC | The horizontal and vertical sync control signals into the video decoder. |
| VID_PIXEL_CLK | Clock input used to control the pixel data transfer. |
| VID_CREF | Informational output signal indicating which type of data (luma or chroma) is currently on the VID_PIXEL_DATA_OUT bus. |

Internal DENC

| | |
|---|---|
| MP, VP | 8-bit data bus inputs to the DENC carrying the luma and chroma values for each pixel of a digital video picture to be displayed. The source of the data can be programmed internally to the DENC from either bus. |
| HS Out, VS Out | Horizontal and vertical sync control outputs from the DENC when it is running as a sync master. |
| PixClk | Clock input used to control the pixel data transfer. |
| HS In, VS In | Horizontal and vertical sync control inputs to the DENC when it is running as a sync slave. |

DMSD

| | |
|---|---|
| CREF | Informational output signal indicating which type of data (luma or chroma) is currently on the YUV bus. |
| CLK | Clock output used to control the pixel data transfer. |
| YUV | 8-bit data bus output from the DMSD carrying the luma and chroma values for each pixel of the digital video picture. |
| HS, VS | Horizontal and vertical sync control outputs from the DMSD. |

Graphics Controller

| | |
|---|---|
| CREF | Informational input signal indicating which type of data (luma or chroma) is currently on the |

-continued

| | |
|---|---|
| Video In | Video In bus. 8-bit data bus input to the graphics controller carrying the luma and chroma values for each pixel of a digital video picture which will be manipulated by the unit. |
| HS In, VS In | Sync control inputs to the graphics controller for the incoming video data stream (Video In). |
| Cref | Informational output signal indicating which type of data (luma or chroma) is currently on the YUV bus. |
| YUV | 8-bit data bus output from the graphics controller carrying the luma and chroma values for each pixel of the digital video picture. |
| HS, VS | Sync control outputs from the graphics controller for the outbound video data stream (YUV). |
| PCLK | Clock input or output used to control the pixel data transfer over the corresponding pixel data bus (Video In or YUV). |
| External DENC | |
| CREF | Informational input signal indicating which type of data (luma or chroma) is currently being received on the PData bus. |
| PDATA | 8-bit data bus input to the DENC carrying the luma and chroma values for each pixel of a digital video picture to be displayed. |
| HS, VS | Sync control inputs to the DENC. |
| PixClk | Clock input used to control the pixel data transfer. |

FIG. 4 depicts a first connection configuration wherein the video decode system chip 200 includes video decoder 220 and internal digital video encoder (DENC) macro 225, as well as an EGV port 210 constructed in accordance with the principles of the present invention. In one embodiment, port 210 comprises twelve I/O pins, 8 of which are for pixel data, 2 for horizontal and vertical sync signals, 1 for a chroma reference (CREF) signal, and 1 for a clock (not shown). In accordance with the principles of the present invention, these same twelve pins can be employed with the EGV port to accomplish various connection configurations of the system chip to external circuitry, as explained further below. In this embodiment, chip 200 is coupled to an external DENC 230 through EGV port 210.

With the configuration of FIG. 4, external DENC 230 is used instead of internal DENC 225 within integrated system chip 200. This may be useful if, for example, external DENC 230 provides support for functions not available on the internal DENC 225, such as SECAM encoding. As shown, the EGV port is configured so that the CREF and pixel data signals are sourced from the video decoder and sent to the external DENC, while the external DENC operates as the sync master and drives the sync signals into the video decoder through the EGV port. Communication with the internal DENC is effectively cut off, since the internal DENC is not functionally required in this configuration.

Figure 5:
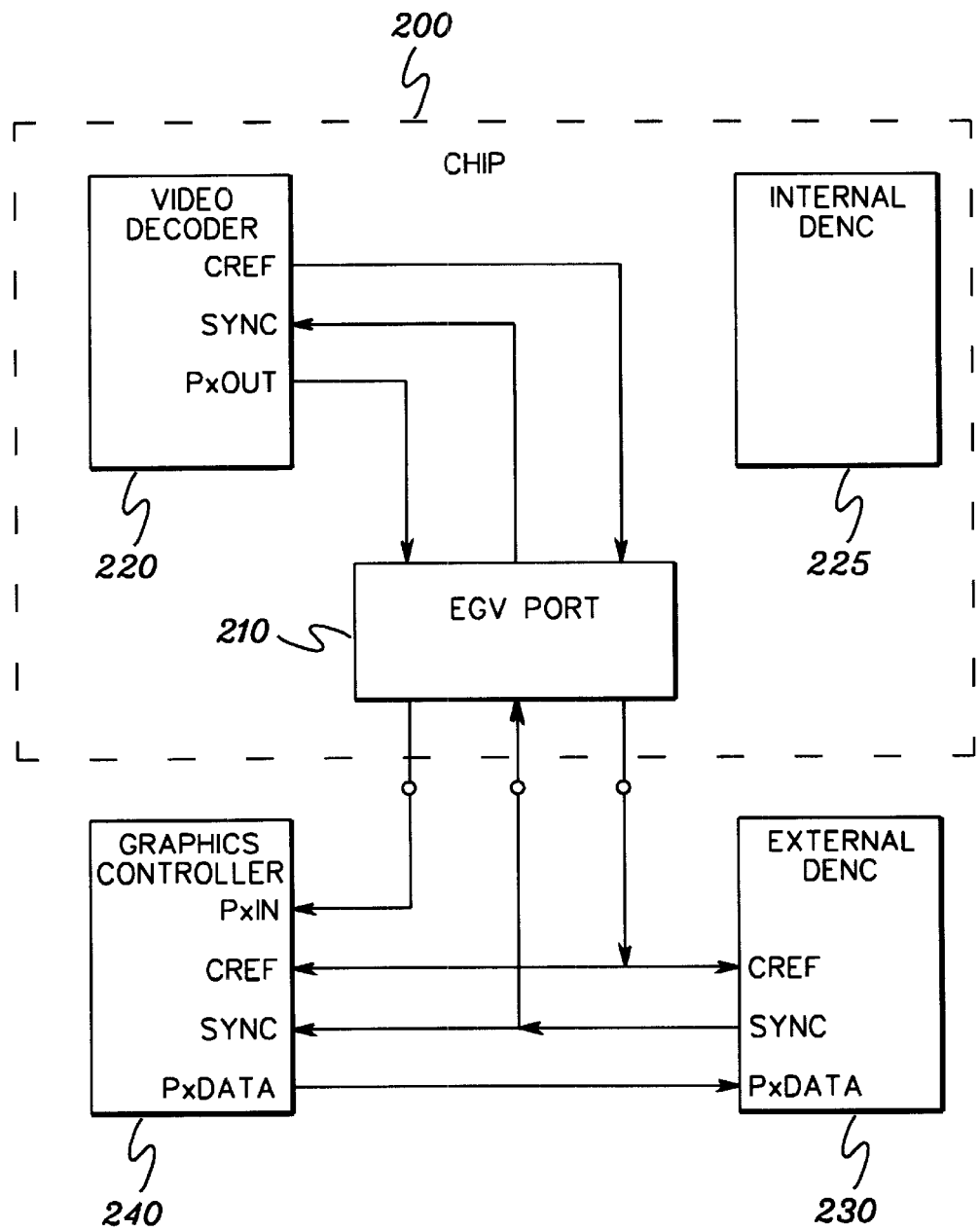
FIG. 5 depicts another connection example for an EGV port in accordance with the principles of the present invention, wherein an external graphics controller and external digital display generator circuitry are coupled to the video decode system chip.
Figure 6:
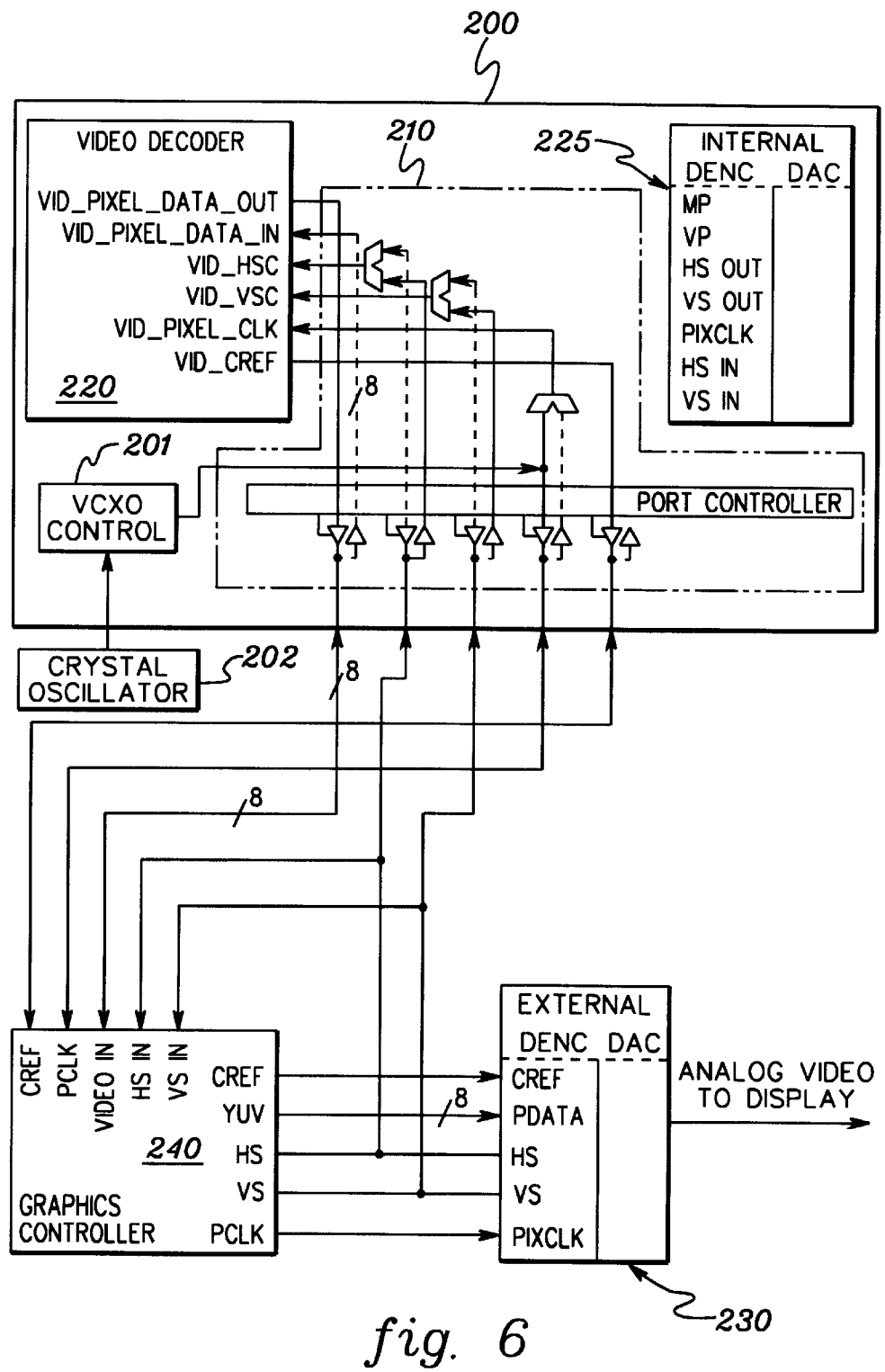
FIG. 6 is a more detailed depiction of the external graphics controller, external digital display generator circuitry and STB chip connections for the EGV port application of FIG. 5.

FIGS. 5 & 6 depict in higher level and more detail, respectively, a connection configuration wherein video decode system chip 200 is coupled to an external graphics controller 240, as well as to an external DENC 230 through the EGV port 210. In this configuration, video decoder 220 provides video pixel data (decoded video plus OSD graphics) to external graphics controller 240 via the EGV port 210 where the decoded video or video with OSD can be further blended or mixed with, for example, different capability graphics provided by the external graphics controller. This higher function video and graphics pixel information would then be delivered to the external DENC 230.

Note that as shown in FIG. 6, both internal DENC 225 and the external DENC 230 include a digital-to-analog converter (DAC) for converting the digital data signal to analog video for display. Also, note in FIGS. 6, 8, 11 & 13 that the phantom connection lines within the EGV port 210 are shown for completeness, and do not form part of the active connections for the respective configurations.

The addition of an external graphics controller may be desirable if a particular application requires higher performance capability graphics than that provided by the video decoder. By way of example, this requirement might arise with character generation, special drawing functions (line, circle, rectangle . . . ), or video scaling or additional graphics planes. such that the CREF and pixel data signals are sourced from the video decoder 220 to graphics controller 240 and external DENC 230. The clock source for this configuration could be a voltage controlled crystal oscillator 202 that is frequency locked by VCXO control 201 circuitry to the incoming transport stream. Using a clock thus tied to the input stream results in better output picture quality since dropping/repeating of frames to maintain synchronization is minimized. Either the graphics controller or the external DENC operates as the sync master, and drives the sync signals to the other external device as well as the video decoder via the EGV port. In the depicted example, the sync signals are assumed to originate with external DENC 230. Again, communication with the internal DENC is effectively cut off, since it is not functionally required for this configuration.

Figure 8:
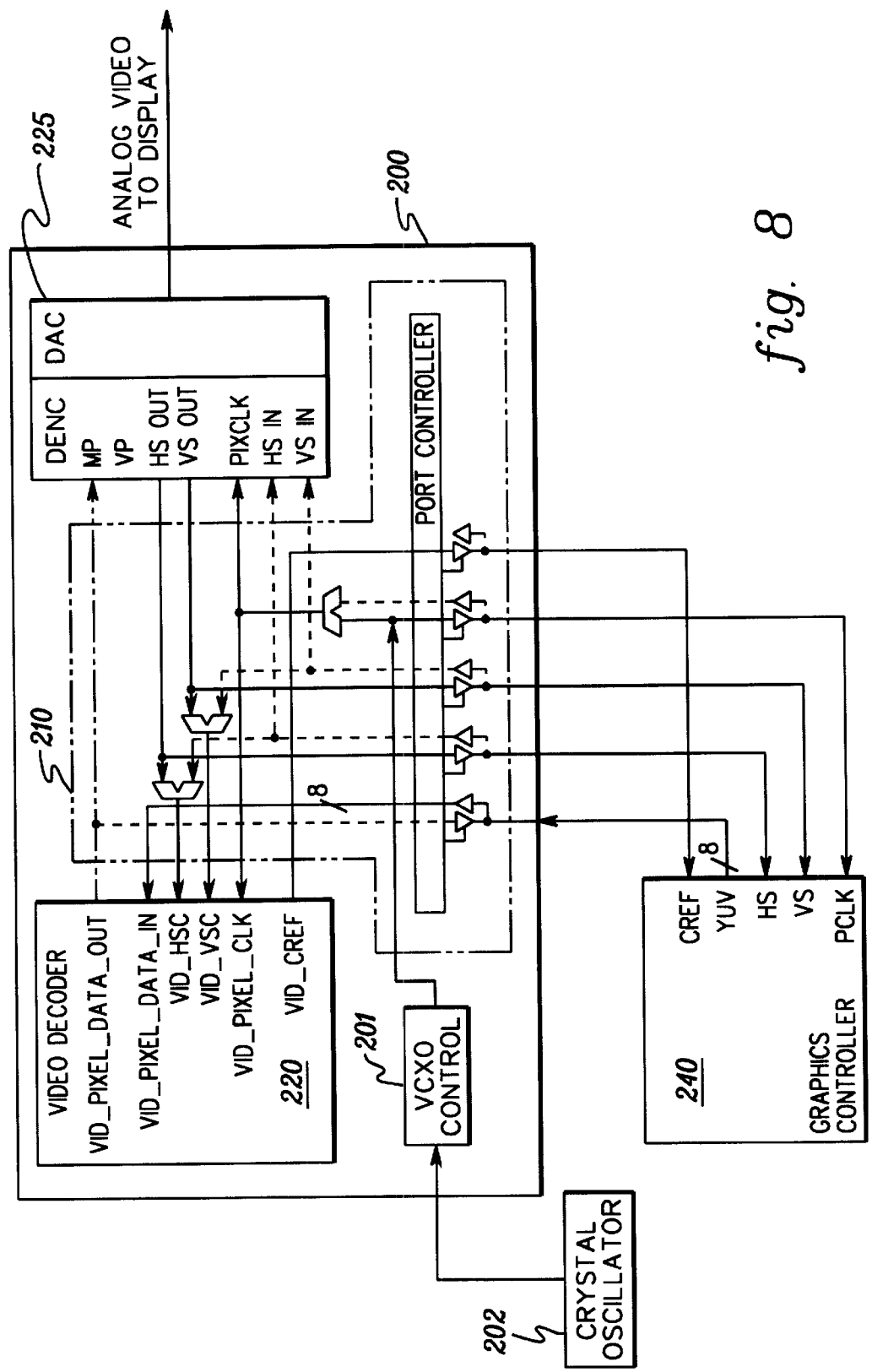
FIG. 8 is a more detailed depiction of the EGV port application of FIG. 7 showing signal connections between the external graphics controller and the video decode system chip.

FIGS. 7 & 8 depict a configuration where an external graphics controller 240 provides graphics data to EGV port 210 which passes the graphics information to video decoder 220 of video decode system chip 200 for blending/mixing with decompressed digital video. The resultant video/graphic data is then forwarded to internal DENC 225. This configuration allows a higher function, external graphics controller to provide graphics data to the chip for further blending or mixing with the decompressed digital video in the video decoder. The configuration allows certain of the high function graphics capabilities described above in connection with FIGS. 5 & 6, except those which operate on the decompressed video data (e.g., scaling). This limits the features such as scaling to only those modes supported by the video decoder, but does not require the extra costs associated with the external DENC of FIGS. 5 & 6.

In FIGS. 7 & 8, the EGV port is again configured so that the CREF signal is sourced from the video decoder 220 and sent to the graphics controller 240. The inputs/outputs associated with the pixel data however are now configured as receivers, sourced from the external graphics controller 240, and are fed to the video decoder's "video input" port. The video decoder merges the graphics data with its decompressed video and forwards the resultant pixel data to the internal DENC 225 via the steering logic of the EGV port, for example, reference logic 212 of FIG. 7 comprising multiplexers and bi-directional control circuitry of the EGV port 210. The source of the clock for this configuration could be a voltage controlled crystal oscillator 202 (FIG. 8) that is frequency locked by VCXO control 201 (FIG. 8) to the incoming transport stream. Again, using a clock thus tied to the input stream results in better output picture quality since dropping/repeating of frames to maintain synchronization is minimized. In this example, the internal DENC 225 is acting as the sync master, with the EGV port configured to drive its sync signals to both the video decoder and off chip to the graphics controller 240.

Figure 9:
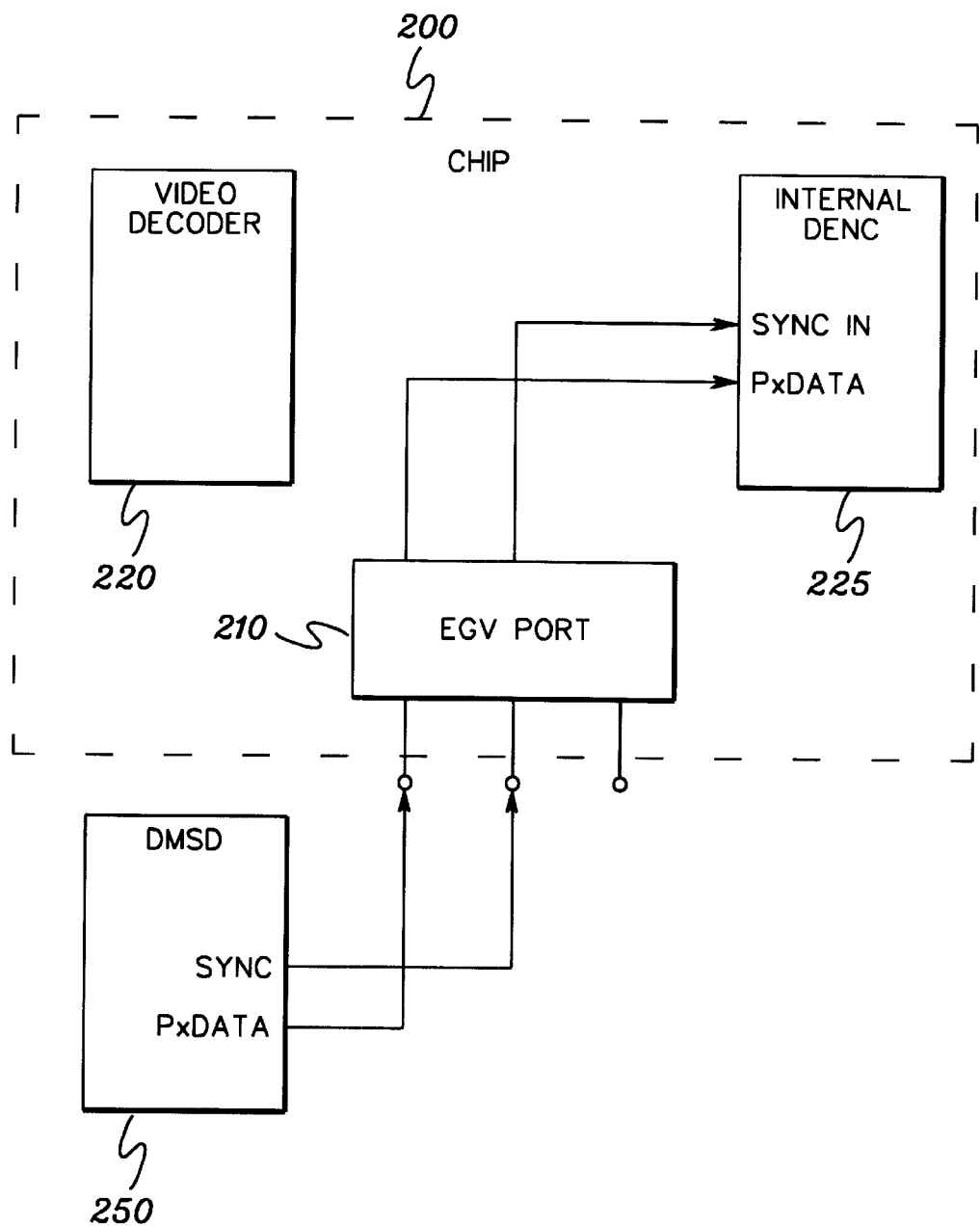
FIG. 9 depicts still another connection example for an EGV port in accordance with the principles of the present invention, wherein an external digital multi-standard decoder is connected to the digital video decode system chip.

FIG. 9 depicts another configuration illustrating a capability to connect a TV decoder, or digital multi-standard decoder (DMSD), to the internal DENC 225 via the EGV port 210. This configuration provides a means to deliver an analog input channel to the internal DENC. The configuration may be desirable in a mixed mode video set-top box application to support viewing conventional analog channels without the added cost and complexity of an external DENC, or the need for any muxing/switching logic to select between the internal and external DENC video outputs. This mode is also useful in a chip test mode, allowing direct access and testing of the internal DENC from the chip I/Os.

In this mode, the EGV port 210 is again configured such that the sync, pixel clock (not shown), and pixel data signals are being received from the DMSD 250 and sent only ti the internal DENC 225. In this case, the DMSD 250 is now the sync master and DENC 225 is the sync slave. The CREF signal is not required by internal DENC and is functionally disconnected.

Figure 10:
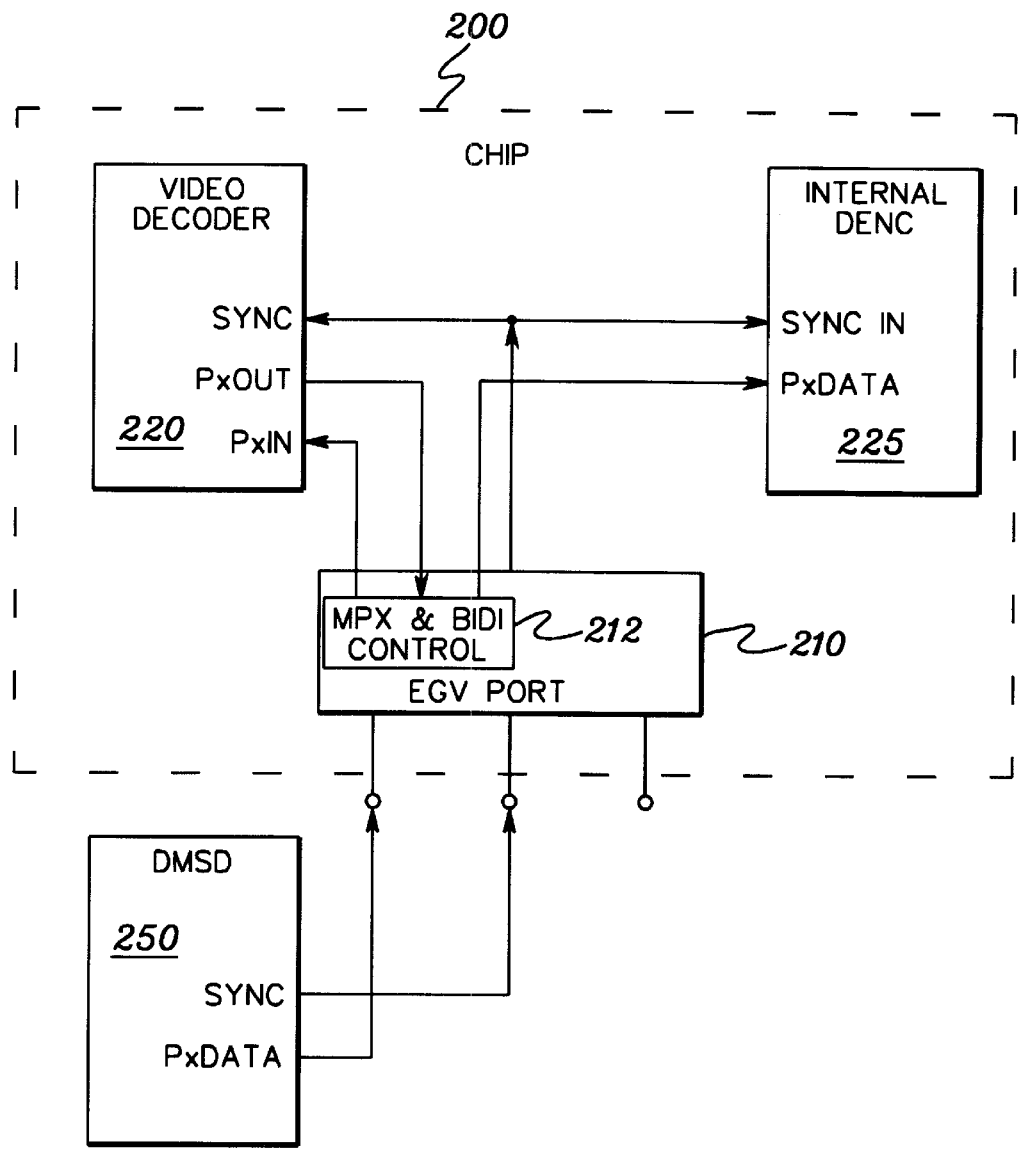
FIG. 10 depicts another connection example for the EGV port in accordance with the principles of the present invention, showing connection of the external digital multi-standard decoder to both the video decoder and the internal digital display generator circuitry of the video decode system chip.
Figure 11:
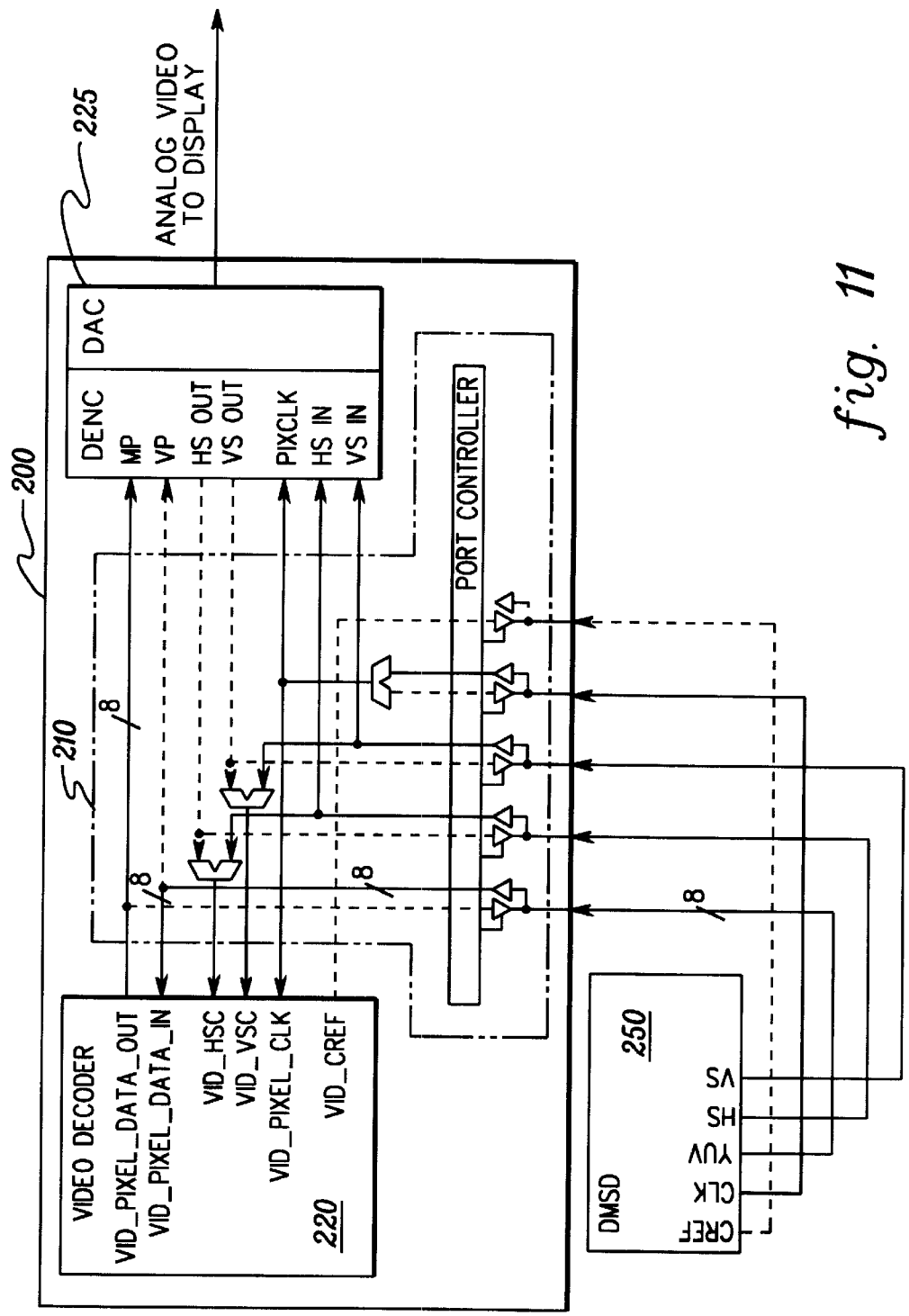
FIG. 11 is a more detailed block diagram of the EGV port application of FIG. 10.

FIGS. 10 & 11 depict an enhancement to the configuration of FIG. 9. In this configuration, the EGV port has the capability to connect the DMSD 250 to the video decoder 220 of the video decode system chip 200, as well as to the internal DENC 225. The configuration again provides a means to deliver an analog sourced input channel to the internal DENC, and with the connection to the video decoder, allows blending of OSD graphics with the analog sourced video.

This type of configuration may be desirable in a mixed mode set-top box application to support viewing conventional analog channels without the added cost and complexity of an external DENC and any muxing/switching logic to select between the internal and external DENC's video outputs. The addition of OSD graphics capability in this mode allows the application to support normal digital set-top box graphic functions (blended vs. mixed) with analog channels as well as with the digital channels.

In this mode the EGV port is configured such that the sync, pixel clock and pixel data signals are being received from the DMSD 250, with the DMSD again being the sync master. Sourcing the clock for this configuration from the DMSD is necessary to reduce picture jitter due to variance in the analog signal and conversion process, resulting in a better quality output picture. Compared with FIG. 9, in this embodiment, the syncs are sent to both video decoder 220 and internal DENC 225, i.e., the video decoder and the internal DENC are sync slaves. The pixel data is routed to the video decoder's "video in" port through the multiplexers and bi-directional control circuitry 212 of the EGV port 210. The video decoder then operates on the received data and performs any blending with its OSD graphics data. The resultant pixel data is then routed to the internal DENC 225. Again, the CREF signal is not required by the internal DENC and is functionally disconnected.

Figure 12:
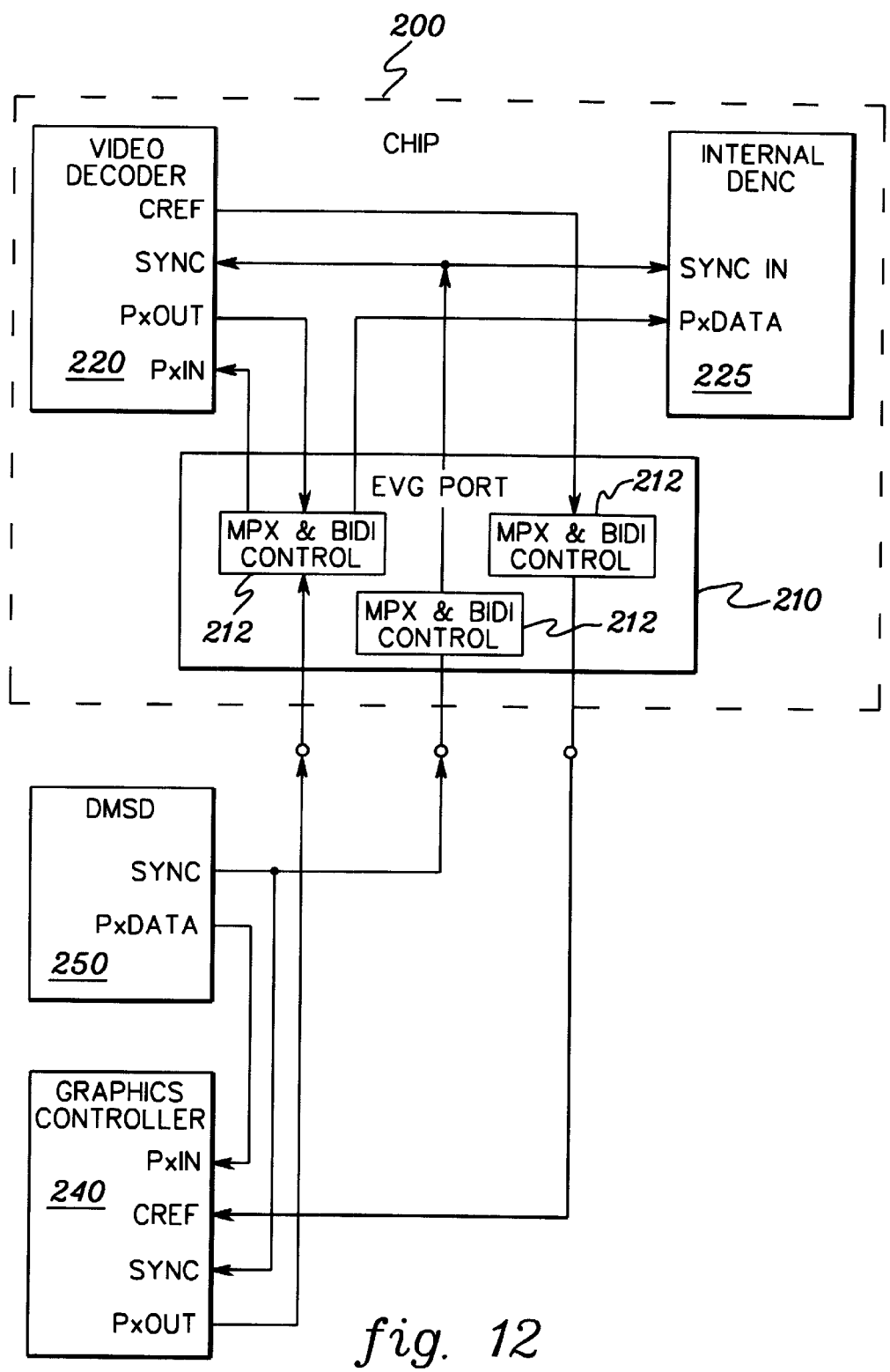
FIG. 12 is a yet further connection example for an EGV port in accordance with the principles of the present invention, wherein both an external digital multi-standard decoder and an external graphics controller are coupled to the video decode system chip.
Figure 13:
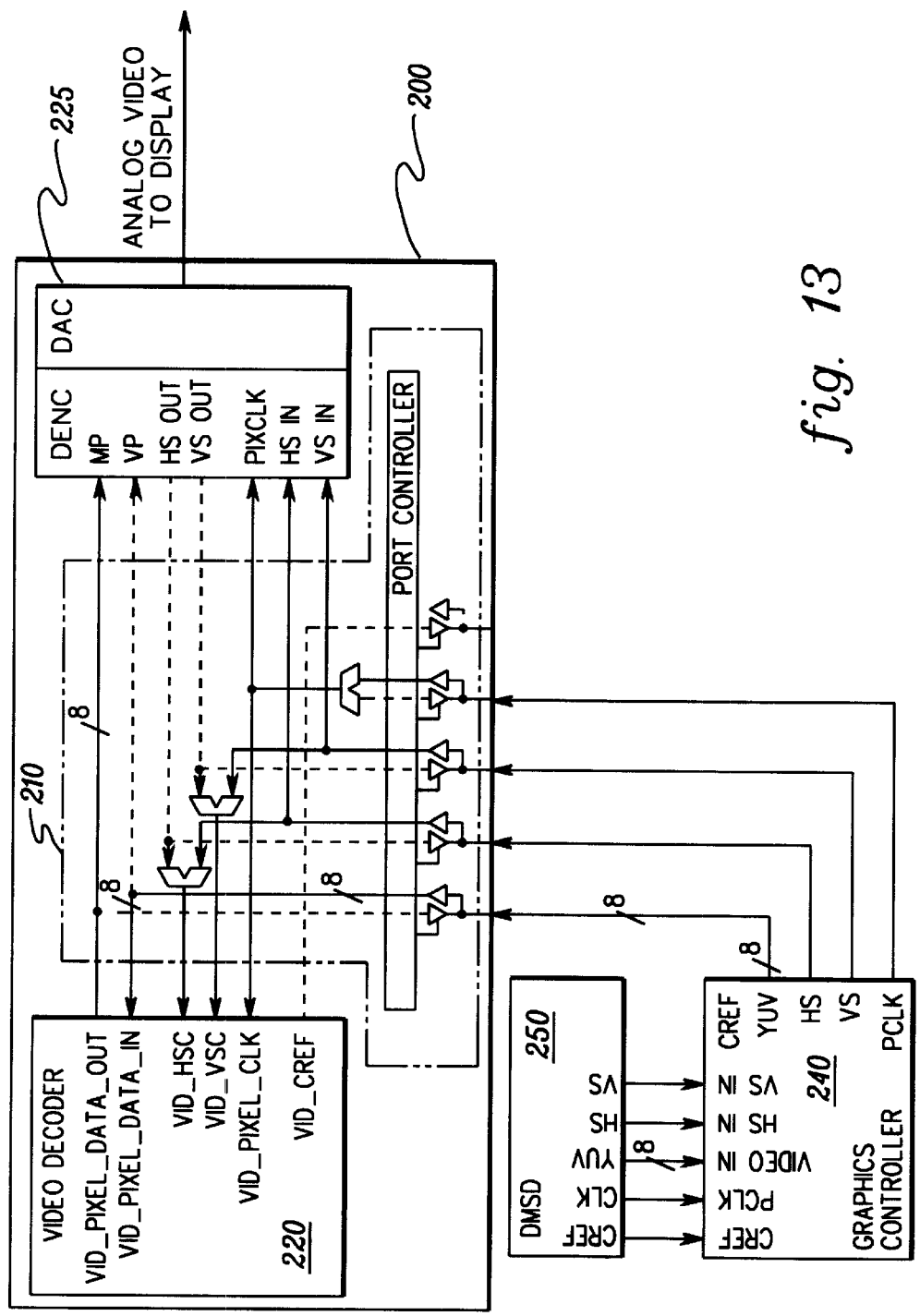
FIG. 13 is a more detailed block diagram of the EGV port application of FIG. 12.

FIGS. 12 & 13 depict still another configuration utilizing the configurable port 210 of the present invention. This configuration illustrates the capability to connect both a DMSD 250 and a graphics controller 240 to the video decoder 220 and internal DENC 225 via the EGV port 210. The configuration again provides a means to deliver an analog input channel to the system, while also providing the capability to deliver higher function graphics as discussed above. The digitized analog video or graphics data alone can be passed into the integrated chip 200, or the graphics controller can process the digitized analog video (blending, a scaling, etc.) and pass the resultant data to the EGV port 210. This video stream is then further processed by the video decoder, which can then blend either its own OSD graphics or the decompressed digital video before sending it on to the internal DENC to be displayed.

In this mode, the EGV port is configured such that the sync, pixel clock and pixel data signals are sourced by the DMSD and/or the external graphics controller. Again, the source of the clock for this configuration is the DMSD. From the EGV port the syncs are sent to both the video decoder and the internal DENC (i.e., both decoder and DENC are sync slaves), while the pixel data is routed to the video decoder's 'video in' port. After processing by the video decoder, the resultant pixel data is routed to the internal DENC 225. The CREF signal is again not required by the internal DENC and its functionality is disconnected in this configuration.

Those skilled in the art will note that the above-described configurations for a single 12-pin interface in accordance with the principles of the present invention allow:

External graphics upgrading that requires no glue logic and no additional digital display generator circuitry.

Internal DENC isolated testing for macrovision certification.

Blending graphics on an analog channel equivalent to a digital channel's graphics capability.

Blending upgraded external graphics with an analog and digital channel utilizing an external DENC.

Adding additional graphics plane(s) to an integrated video decoder's existing graphics capability, maintaining software compatibility for base graphics function.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An external graphics/video (EGV) port for a video decode system chip having a video decoder and an internal digital display generator circuit, said EGV port comprising:

receiver/driver circuitry for accommodating a plurality of input/output signals;

a programmable port controller adapted to be coupled between said receiver/driver circuitry and at least one internal bus of said video decode system chip coupled to at least one of said video decoder and said internal digital display generator circuit, said programmable port controller being programmable to either receive data into said video decode system chip for forwarding to at least one of said video decoder and said internal digital display generator circuit or to send data out from said video decode system chip from at least one of said video decoder and said internal digital display generator circuit, said data being received through or sent out through said receiver/driver circuitry;

wherein said programmable port controller is adapted to coordinate data flow between said video decoder, said internal digital display generator circuit, and at least one of an external graphics controller, an external digital display generator circuit, and an external digital multi-standard decoder (DMSD); and wherein said video decode system chip is coupled to at least one of said external graphics controller and said external digital display generator circuit through said EGV port, and wherein said programmable port controller is adapted to either allow said internal digital display generator circuit to generate a master synchronization signal for distribution to said video decoder and at least one of said external graphics controller and said external digital display generator circuit or allow said external digital display generator circuit to generate a master synchronization signal for distribution to at least one of said video decoder and said internal digital display generator circuit, as well as to said external graphics controller.

2. The EGV port of claim 1, wherein said video decode system chip is employed in at least one of a digital video set-top box, a digital video disc (DVD) player, or a computer enabled with a DVD drive.

3. The EGV port of claim 1, further comprising a plurality of signal input/output (I/O) pins on said video decode system chip, said receiver/driver circuitry being coupled to said plurality of signal I/O pins for accommodating said plurality of input/output signals.

4. The EGV port of claim 3, wherein at least one pin of said plurality of signal I/O pins comprises a sync pin, and wherein said programmable port controller is adapted to either receive for said video decode system chip or send from said video decode system chip the master sync signal for coordinating data flow between said video decoder, said internal digital display generator circuit, and at least one of an external graphics controller, an external digital display generator circuit, and an external digital multi-standard decoder (DMSD).

5. The EGV port of claim 4, wherein said at least one sync pin comprises a horizontal synchronization signal pin and a vertical synchronization signal pin.

6. The EGV port of claim 1, wherein said plurality of input/output signals comprise at least some of: video pixel data signals; said master synchronization signal; a chrominance reference signal; and a clock signal.

7. The EGV port of claim 6, wherein said plurality of input/output signals comprise said video pixel data and said master synchronization signal, and wherein said programmable port controller is programmable to either receive or send said video pixel data and is further independently programmable to either receive or send said master synchronization signal, said master synchronization signal being associated with said video pixel data.

8. The EGV port of claim 1, wherein said programmable port controller is programmed to couple said external digital display generator circuit to said video decoder of said video decode system chip.

9. The EGV port of claim 8, wherein said programmable port controller is programmed to forward video pixel output from said video decoder to said external digital display generator circuit simultaneous with providing said video decoder with said master synchronization signal from said external digital display generator circuit.

10. The EGV port of claim 9, wherein said programmable port controller is programmed to provide in parallel at least eight video pixel output bit lines, a horizontal synchronization signal bit line, a vertical synchronization signal bit line and a chroma reference bit line for coupling said video decoder and said external digital display generator circuit.

11. The EGV port of claim 1, wherein said programmable port controller is programmed to couple said external graphics controller and said external digital display generator circuit to said video decoder of said video decode system chip.

12. The EGV port of claim 11, wherein said programmable port controller is programmed to forward video pixel output from said video decoder to said external graphics controller, and wherein said external graphics controller is adapted to feed video pixel output to said external digital display generator circuit in response to said video pixel output from said video decoder, and wherein said external digital display generator circuit is adapted to provide said video decoder and said external graphics controller with said master synchronization signal for said video pixel output, said master synchronization signal being provided to said video decoder via said EGV port.

13. The EGV port of claim 12, wherein said programmable port controller is programmed to provide a chroma reference signal from said video decoder to said external graphics controller and said external digital display generator circuit along with providing said video pixel output from said video decoder to said external graphics controller and said master synchronization signal from said external digital display generator circuit to said video decoder.

14. The EGV port of claim 1, wherein said programmable port controller is programmed to couple said external graphics controller to said video decoder of said video decode system chip for provision of graphics data for overlaying or blending within said video decoder with video pixel data.

15. The EGV port of claim 14, wherein said programmable port controller is further programmed to forward said master synchronization signal from said internal digital display generator circuit to said external graphics controller along with providing said graphics data to said video decoder from said external graphics controller.

16. The EGV port of claim 15, wherein said programmable port controller is further programmed to forward a chrominance reference signal from said video decoder to said external graphics controller along with providing said graphics data to said video decoder from said external graphics controller and providing said master synchronization signal to said external graphics controller from said internal digital display generator circuit.

17. The EGV port of claim 1, wherein said programmable port controller is adapted to couple said external digital multi-standard decoder (DMSD) to said internal digital display generator circuit.

18. The EGV port of claim 1, wherein said programmable port controller is adapted to couple said external graphics controller and said external digital multi-standard decoder (DMSD) to said video decoder and said internal digital display generator circuit of said video decode system chip.

19. The EGV port of claim 1, wherein said programmable port controller is configurable to any one of multiple configurations of external device connections to at least one of said video decoder and said internal digital display generator circuit of said video decode system chip.

20. The EGV port of claim 19, wherein said multiple configurations comprise:
 said external digital display generator circuit coupled to said video decoder;
 said external graphics controller and said external digital display generator circuit both coupled to said video decoder;
 said external graphics controller coupled to both said video decoder and said internal digital display generator circuit;
 said external digital multi-standard decoder (DMSD) coupled to said internal digital display generator circuit;
 said external DMSD coupled to both said video decoder and said internal digital display generator circuit; and said external DMSD and said external graphics controller coupled to both said video decoder and said internal digital display generator circuit.

21. A programmable bidirectional external graphics/video (EGV) port for a video decode system chip having a video decoder and an internal digital display generator circuit, said EGV port comprising:

a plurality of signal input/output (I/O) receivers/drivers;

a programmable port controller coupled to said plurality of I/O receivers/drivers and to at least one internal bus of said video decode system chip coupled to at least one of said video decoder and to said internal digital display generator circuit, said programmable port controller comprising first programmable logic for receiving video pixel data on chip or sending video pixel data off chip and second programmable logic for independently receiving on chip or sending off chip a master synchronization signal for said video pixel data, wherein said first programmable logic and said second programmable logic allow outputting of pixel data from said chip while inputting the master synchronization signal therefor to said chip, and allow inputting of video pixel data to said chip while outputting the master synchronization signal therefor from said chip;

wherein said second programmable logic is adapted to coordinate flow of said master synchronization signal between said video decoder, said internal digital display generator circuit, and at least one of an external graphics controller, an external digital display generator circuit, and an external digital multi-standard decode (DMSD); and wherein said video decode system chip is coupled to at least one of said external graphics controller and said external digital display generator circuit through said EGV port, and wherein said second programmable logic is adapted to either allow said internal digital display generator circuit to generate said master synchronization signal for distribution to said video decoder and at least one of said external graphics controller and said external digital display generator circuit, or allow said external digital display generator circuit to generate said master synchronization signal for distribution to at least one of said video decoder and said internal digital display generator circuit, as well as to said external graphics controller.

22. The EGV port of claim 21, wherein said video decode system chip is employed in at least one of a digital video set-top box or a digital video disc player.

23. The EGV port of claim 21, wherein said second programmable logic independently receives on chip or sends off chip two synchronization signals for said video pixel data, said two synchronization signals comprising a horizontal synchronization signal and a vertical synchronization signal.

24. The EGV port of claim 21, wherein said programmable port controller is configurable to any one of multiple configurations of external device connections to at least one of said video decoder and said internal digital display generator circuit of said video decode system chip.

25. The EGV port of claim 24, wherein said multiple configuration comprise:

said external digital display generator circuit coupled to said video decoder;

said external graphics controller and said external digital display generator circuit both coupled to said video decoder;

said external graphics controller coupled to both said video decoder and said internal digital display generator circuit;

said external digital multi-standard decoder (DMSD) coupled to said internal digital display generator circuit;

said external DMSD coupled to both said video decoder and said internal digital display generator circuit; and said external DMSD and said external graphics controller coupled to both said video decoder and said internal digital display generator circuit.

* * * * *